May 26, 1942.  E. M. TUCKER ET AL  2,284,075
SNOW TRACTOR
Filed Feb. 12, 1941   2 Sheets-Sheet 1
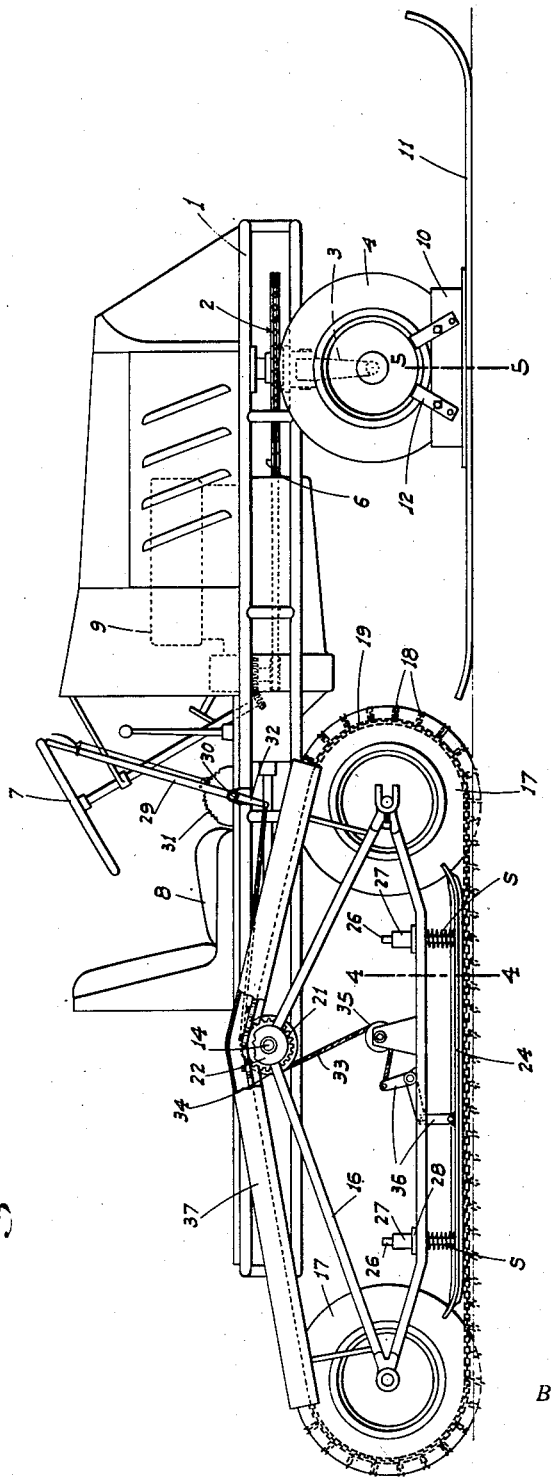
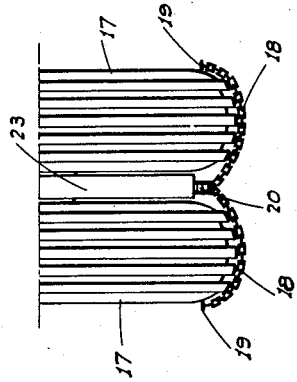
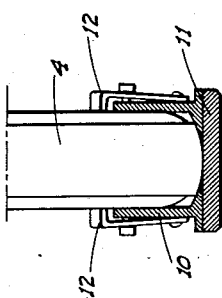
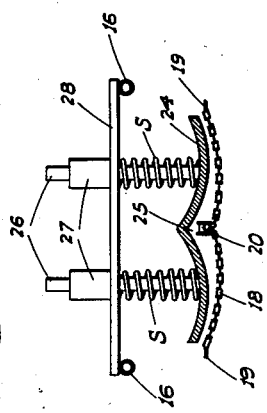
INVENTORS
E. M. Tucker
E. M. Tucker Jr.
J. M. Tucker
BY
Webster & Webster
ATTORNEYS

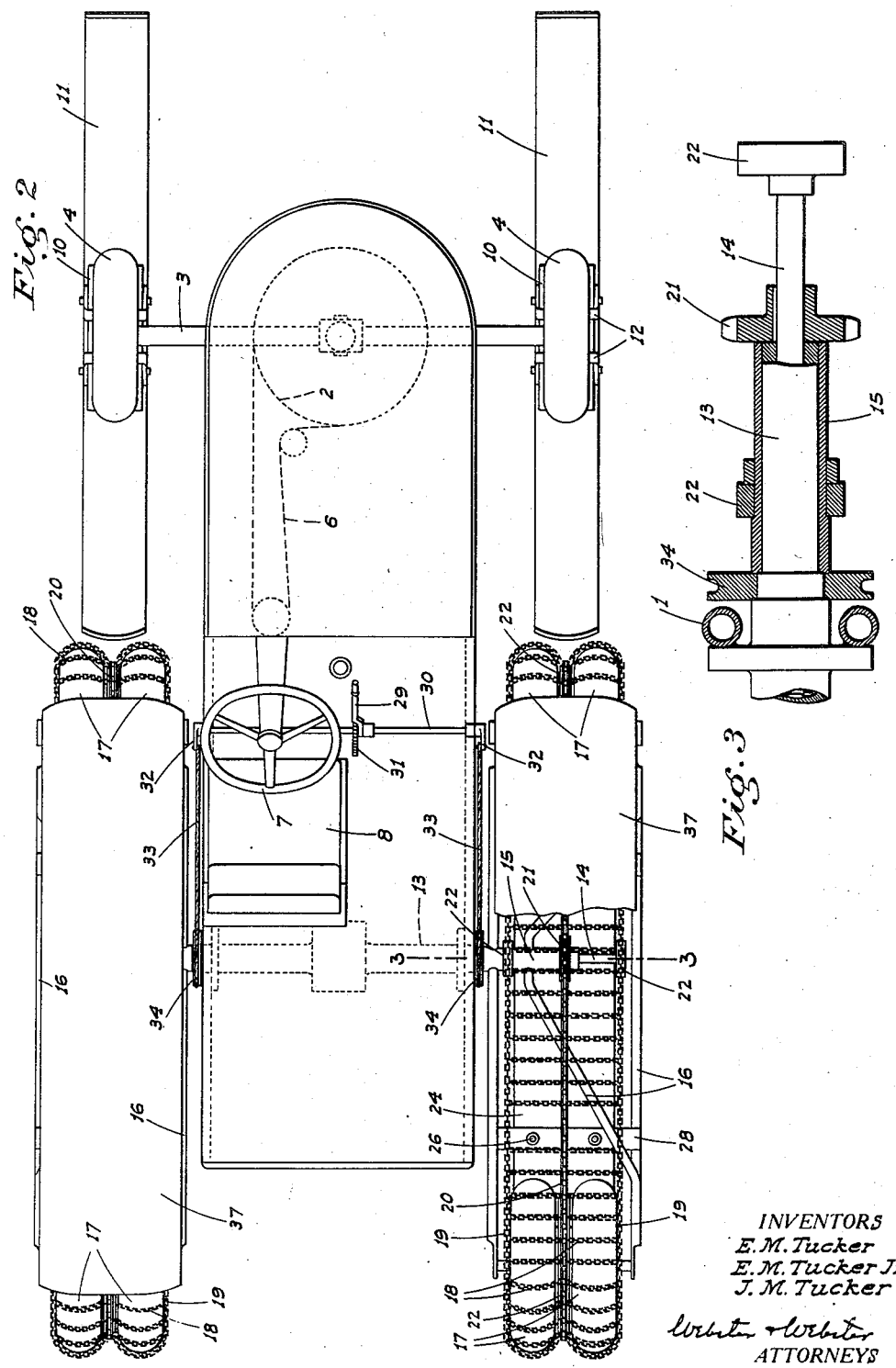

Patented May 26, 1942

2,284,075

UNITED STATES PATENT OFFICE 2,284,075

SNOW TRACTOR

Emmitt M. Tucker, Emmitt M. Tucker, Jr., and Joseph M. Tucker, Huntington Park, Calif.

Application February 12, 1941, Serial No. 378,556

8 Claims. (Cl. 180—5)

This invention relates to self-propelled vehicles for use on snow, our principal object being to provide a snow tractor of the bob-sled type having great tractive power without excessive weight, and one which may be run backwards or forwards with equal speed and efficiency.

A further object is to provide a tractor of this character which may be quickly adapted for travel over bare ground, so that it may be operated under its own power, regardless of surface conditions.

A further object is to provide adjustable means whereby the tractive efficiency may be maintained under varying snow conditions.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Fig. 1 is a side elevation of our improved snow tractor.

Fig. 2 is a top plan view of the same, with one guard partly broken away.

Fig. 3 is a fragmentary enlarged transverse section on the line 3—3 of Fig. 2.

Fig. 4 is a similar view on the line 4—4 of Fig. 1.

Fig. 5 is a similar view on the line 5—5 of Fig. 1.

Fig. 6 is a fragmentary rear end view of the front dual track supporting wheels of the tractor.

Referring now more particularly to the characters of reference on the drawings, the tractor includes a main supporting frame 1, substantially rectangular in form. Adjacent its forward end a fifth wheel 2 is mounted on the frame, which supports a transverse swivel axle 3 on the ends of which pneumatic tired wheels 4 are mounted. The fifth wheel is steered by a chain arrangement 6 controlled from a steering wheel 7 mounted intermediate the ends of the frame and operated from a seat 8 thereon, as in automotive practice. An enclosed gas engine 9 is mounted on the frame ahead of the steering wheel. The wheels 4 normally seat in wells 10 mounted on skids or runners 11, the wheels being removably but rigidly held in the wells by suitable means, such as clamps 12.

The propelling mechanism of the tractor includes a transverse axle and differential housing 13 mounted on the frame 1 rearwardly of the seat and in which an engine-driven axle unit 14 is disposed in the manner conventional to automotive practice; the housing and unit projecting laterally out from the frame 1 some distance on both sides, as plainly shown.

On each side of the frame 1 a sleeve 15 is turnably mounted on the projecting portion of the housing 13, an auxiliary frame structure 16 being rigid with and depending from the sleeve; said structure projecting both forwardly and rearwardly of said sleeve. The frame structure 16 is preferably of open-work bar form and includes transversely spaced units, as shown in Fig. 2.

Dual tired wheels 17 are journaled in the frame 16 at the ends thereof, being disposed between the units of said frame. The runners 11 are located centrally of the wheels so as to compact the snow for the latter.

An endless traction device extends about and between the wheels, said device being in the form of three transversely spaced parallel chains connected at short intervals by cross chains 18. The side chains 19 of the device, which engage the tires of the wheels at the sides, are of the usual skid-chain type as are the cross chains; while the intermediate chain 20 is of a conventional sprocket-drive type and includes attachment links of suitable form to which the cross chains 18 are connected.

The upper run of the chain 20 intermediate its ends passes over and engages a drive sprocket 21 fixed on the adjacent projecting end of shaft 14; the side chains 19 riding on idlers 22 mounted concentric with said shaft (see Fig. 5). The chain 20 engages idler bands 23 disposed between the tires of wheels 17 so that the runs of all three chains are kept equally taut. A snow engaging driving structure is therefore provided which is light and yet will give great tractive efficiency without slipping.

In order, however, to insure a non-slipping action of the cross chains 18 when in the snow, a runner 24 is disposed between the corresponding wheels 17 on each side and just above the lower run of the traction chain unit. The run extends the full distance between the wheels and its width is slightly less than the distance between the side chains 19. The runner is preferably convex on its under side and at its center of width is relieved underneath as at 25 so as to provide clearance for the central chain 20.

The runner is mounted in connection with the frame 16 for vertical movement relative thereto by stems 26 projecting upwardly from the runner and slidable through sleeves 27 fixed on cross bars 28 extending between the lower members of the frame units 16 some distance above the runner. Compression springs 8 about the stems between said bars and the runner yieldably press the runner down.

Downward movement of the runner is limited without interfering with its upward movement, and such upward movement positively controlled as desired by the driver from the seat 8 by the following means:

Mounted on the frame in a position convenient to the driver is a lever 29, upstanding from a transverse shaft 30 and having a holding pawl and quadrant device 31 associated therewith. Arms 32 depend from said shaft between the frame 1 and the frames 16, cables 33 being connected to the lower end of said arms. These cables then pass about pulleys 34 turnably mounted on the axle housing 13. Below the pulleys 34 the cables pass about direction changing pulleys 35 mounted on the frames 16 and are then connected to bellcrank and link units 36 mounted on said frames 16 and connected to the runners below. In this manner the runners may be positively lifted, if necessary, and when it is desired to alter the spacing between the runners and the lower run of the traction chains according to the condition or type of snow over which the tractor is operating. At the same time the runners may independently yield upwardly of themselves and no interference with the independent rocking of the frames 16 about the shaft 14 is had.

By means of the above described structure, the driving of the chains 20 of course causes the rotation of the wheels 17 and moves the traction chains as a whole lengthwise, the cross-chains being firmly laid in the snow by the wheels. The snow presses upwardly between the chains and engages the runners, which thus act to limit upward movement of the snow and to hold the snow compacted, and thus keep the cross chains so embedded in the snow that they will not slip. Further tractive efficiency is obtained by making the treads of the tires of the wheels 17 with deep circumferential ribs and grooves as shown in Fig. 6. The shaft 14 about which the frames 16 may rock is of course disposed ahead of the center of length of the frames and traction units, so that there is a greater tendency for the units to press down into the snow at their forward end than would otherwise be the case, and also aiding in providing an efficient non-slipping traction.

In order to protect the driver from possible contact with the moving traction chains and from any snow thrown upwardly therefrom, the chains are covered by guards 37 supported from the frames 16.

If it is desired or necessary that the tractor shall run on bare ground, it is only necessary to remove the clamps 12 from the front wheels, and jack the front end of the frame up sufficiently to enable the wheels to clear the wells so that the wells and front runners 10 may be removed, thus enabling the front wheels to ride directly on the ground. The runners 24 are then elevated as high as possible so that there is no danger of the traction chains dragging against the same. From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. A snow tractor including a main frame, circular longitudinally spaced members on each side of the frame, means mounting the members in connection with the frame, an endless traction device supported from the members and including side chains and an intermediate drive chain, all said chains passing about and engaging the members, and cross chains extending between said side chains and the drive chain; and a driven sprocket engaging said drive chain.

2. A snow tractor including a main frame, circular longitudinally spaced members on each side of the frame, means mounting the members in connection with the frame, an endless traction device supported from the members and including longitudinal transversely spaced chains one of which is a drive chain, and cross members connecting said longitudinal chains; and a drive sprocket engaging said drive chain.

3. A snow tractor including a main frame, circular longitudinally spaced members on each side of the frame, means mounting the members in connection with the frame, an endless traction device supported from the members and including longitudinal transversely spaced chains one of which is a drive chain, and cross members connecting said longitudinal chains; a driven sprocket mounted on the main frame intermediate the members and below the upper run of the drive chain and engaging the same.

4. A tractor as in claim 3, in which the member mounting means includes an auxiliary frame on each side of the main frame; there being means turnably mounting each auxiliary frame axially of the driven sprocket.

5. A tractor as in claim 1, in which the members are in the form of dual-tired wheels; the drive chain being disposed in a transverse plane between the tires of the wheels.

6. A snow tractor including a frame, longitudinally spaced circular members journaled on the frame, a traction device comprising an open endless chain unit extending about and between the members and having upper and lower runs and means to maintain a compacted layer of snow directly above the lower run of the chain unit with the travel of the tractor, said means comprising a snow engaging runner extending substantially the full distance between the members directly above and spaced from said lower run of the chain unit.

7. A snow tractor including a frame, longitudinally spaced circular members journaled on the frame, a traction device comprising an open endless chain unit extending about and between the members and having upper and lower runs, a snow engaging runner disposed between the members directly above the lower run of the chain unit, means mounting the runner in connection with the members for vertical movement relative to said lower run of the chain unit and means to raise and lower the runner.

8. A snow tractor including a frame, longitudinally spaced circular members journaled on the frame, a traction device comprising an open endless chain unit extending about and between the members and having upper and lower runs, a snow engaging runner disposed between the members directly above the lower run of the chain unit, means mounting the runner in connection with the members for vertical movement relative to said lower run of the chain unit, yieldable means urging the runner down and control means to positively lift the runner and also limiting the downward movement of the same.

EMMITT M. TUCKER.
EMMITT M. TUCKER, Jr.
JOSEPH M. TUCKER.